US012107338B2

(12) United States Patent
Chang et al.

(10) Patent No.: US 12,107,338 B2
(45) Date of Patent: Oct. 1, 2024

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 127 days.

(21) Appl. No.: 18/166,540

(22) Filed: Feb. 9, 2023

(65) Prior Publication Data

US 2024/0170859 A1 May 23, 2024

(30) Foreign Application Priority Data

Nov. 17, 2022 (TW) ................................ 111143905

(51) Int. Cl.
*H01Q 21/28* (2006.01)
*H01Q 9/04* (2006.01)

(52) U.S. Cl.
CPC ........... *H01Q 21/28* (2013.01); *H01Q 9/0421* (2013.01)

(58) Field of Classification Search
None
See application file for complete search history.

(56) References Cited

U.S. PATENT DOCUMENTS 11,539,133 B2 12/2022 Chang et al.
2019/0356051 A1* 11/2019 Barrera .................... H01Q 1/44
2020/0287273 A1* 9/2020 Huang ..................... H01Q 1/42
2022/0278445 A1* 9/2022 Woo ........................ H01Q 9/045
2022/0344814 A1 10/2022 Tan et al.
2023/0387572 A1* 11/2023 Xing .................. H01Q 21/0006
2024/0097339 A1* 3/2024 Khatua .................. H01Q 21/24
2024/0186705 A1* 6/2024 Wang ..................... H01Q 9/045

FOREIGN PATENT DOCUMENTS

TW 202243324 A 11/2022
TW 202243327 A 11/2022

OTHER PUBLICATIONS

Chinese language office action dated Dec. 8, 2023, issued in application No. TW 111143905.

* cited by examiner

*Primary Examiner* — Wilson Lee
(74) *Attorney, Agent, or Firm* — McClure, Qualey & Rodack, LLP

(57) ABSTRACT

A mobile device supporting wideband operations includes a feeding radiation element, a first radiation element, a second radiation element, a third radiation element, a shorting radiation element, a fourth radiation element, and a fifth radiation element. The first radiation element is coupled to the feeding radiation element. The second radiation element is adjacent to the first radiation element. The second radiation element and the third radiation element are coupled through the shorting radiation element to a ground voltage. The fourth radiation element is coupled to the feeding point. The fourth radiation element is adjacent to the second radiation element. The fifth radiation element is coupled to the feeding point. An antenna structure is formed by the feeding radiation element, the first radiation element, the second radiation element, the third radiation element, the shorting radiation element, the fourth radiation element, and the fifth radiation element.

15 Claims, 5 Drawing Sheets

500

MOBILE DEVICE SUPPORTING WIDEBAND OPERATION

CROSS REFERENCE TO RELATED APPLICATIONS

This application claims priority of Taiwan Patent Application No. 111143905 filed on Nov. 17, 2022, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a feeding radiation element, a first radiation element, a second radiation element, a third radiation element, a shorting radiation element, a fourth radiation element, and a fifth radiation element. The feeding radiation element has a feeding point. The first radiation element is coupled to the feeding radiation element. The second radiation element is adjacent to the first radiation element. The third radiation element is coupled to the second radiation element. The third radiation element and the second radiation element substantially extend in opposite directions. The second radiation element and the third radiation element are coupled through the shorting radiation element to a ground voltage. The fourth radiation element is coupled to the feeding point. The fourth radiation element is adjacent to the second radiation element. The fifth radiation element is coupled to the feeding point. The fifth radiation element is adjacent to the shorting radiation element. An antenna structure is formed by the feeding radiation element, the first radiation element, the second radiation element, the third radiation element, the shorting radiation element, the fourth radiation element, and the fifth radiation element.

In some embodiments, the feeding radiation element has a tilt angle from 30 to 60 degrees.

In some embodiments, the mobile device further includes a sixth radiation element coupled to the feeding radiation element. The sixth radiation element substantially has a rectangular shape.

In some embodiments, the mobile device further includes a seventh radiation element coupled to the feeding point. The seventh radiation element extends toward the sixth radiation element.

In some embodiments, the mobile device further includes a dielectric substrate. The feeding radiation element, the first radiation element, the second radiation element, the third radiation element, the shorting radiation element, the fourth radiation element, the fifth radiation element, the sixth radiation element, and the seventh radiation element are disposed on the dielectric substrate.

In some embodiments, a first coupling gap is formed between the second radiation element and the first radiation element. A second coupling gap is formed between the fourth radiation element and the second radiation element. A third coupling gap is formed between the fifth radiation element and the shorting radiation element. The width of each of the first coupling gap, the second coupling gap, and the third coupling gap is from 0.5 mm to 1 mm.

In some embodiments, the antenna structure covers a first frequency band, a second frequency band, a third frequency band, a fourth frequency band, a fifth frequency band, and a sixth frequency band. The first frequency band is from 600 MHz to 700 MHz. The second frequency band is from 700 MHz to 960 MHz. The third frequency band is from 1710 MHz to 2170 MHz. The fourth frequency band is from 2300 MHz to 2700 MHz. The fifth frequency band is from 3300 MHz to 3800 MHz. The sixth frequency band is from 5150 MHz to 5850 MHz.

In some embodiments, the total length of the second radiation element and the shorting radiation element is substantially equal to 0.25 wavelength of the first frequency band. The total length of the feeding radiation element and the first radiation element is substantially equal to 0.25 wavelength of the second frequency band.

In some embodiments, the total length of the third radiation element and the shorting radiation element is substantially equal to 0.25 wavelength of the third frequency band. The length of each of the fourth radiation element and the fifth radiation element is substantially equal to 0.25 wavelength of the fourth frequency band.

In some embodiments, the total length of the second radiation element and the third radiation element is substantially equal to 1.5 wavelength of the fifth frequency band. The length of the seventh radiation element is shorter than or equal to 0.25 wavelength of the sixth frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
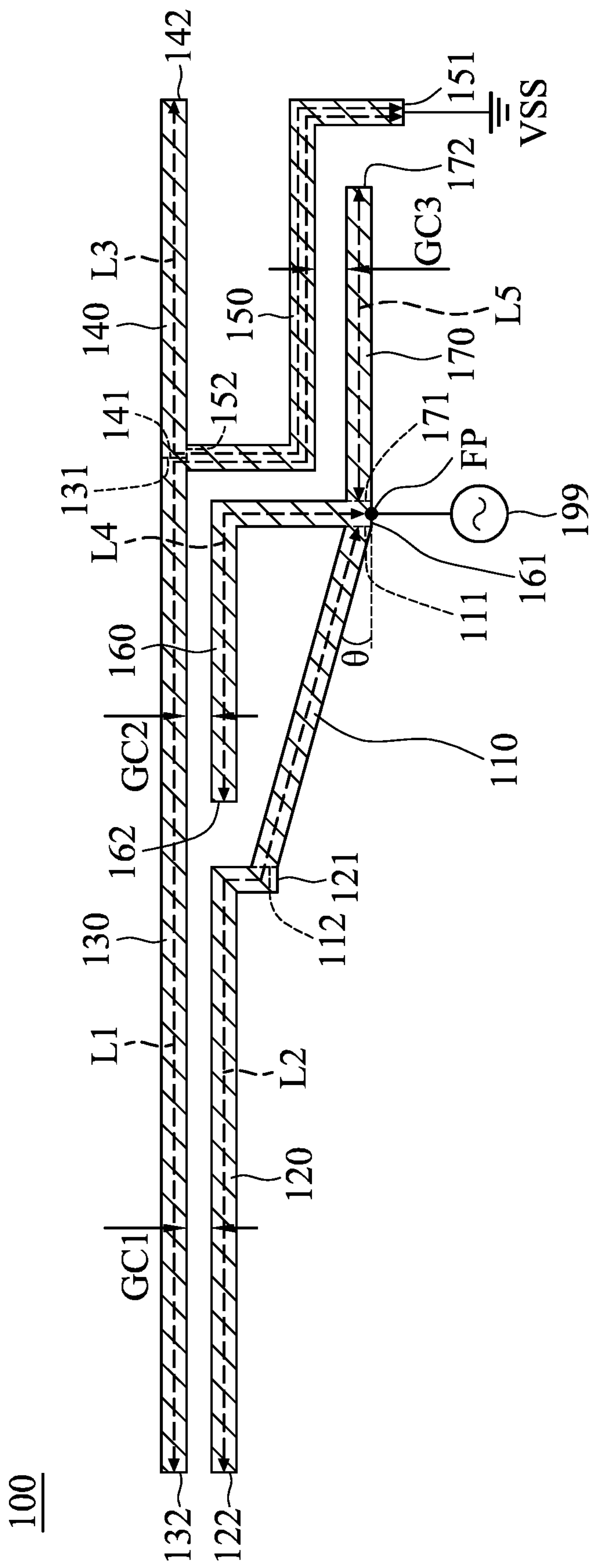
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer. As shown in FIG. 1, the mobile device 100 at least includes a feeding radiation element 110, a first radiation element 120, a second radiation element 130, a third radiation element 140, a shorting radiation element 150, a fourth radiation element 160, and a fifth radiation element 170. The feeding radiation element 110, the first radiation element 120, the second radiation element 130, the third radiation element 140, the shorting radiation element 150, the fourth radiation element 160, and the fifth radiation element 170 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The feeding radiation element 110 may substantially have a straight-line shape. Specifically, the feeding radiation element has a first end 111 and a second end 112. A feeding point FP is positioned at the first end 111 of the feeding radiation element 110. The feeding point FP may also be coupled to a signal source 199 such as an RF (Radio Frequency) module. The feeding radiation element 110 has a tilt angle θ with respect to the horizontal direction. The tilt angle θ may be from 30 to 60 degrees, so as to save space in the overall design.

The first radiation element 120 may substantially have an L-shape. Specifically, the first radiation element 120 has a first end 121 and a second end 122. The first end 121 of the first radiation element 120 is coupled to the second end 112 of the feeding radiation element 110. The second end 122 of the first radiation element 120 is an open end. The second radiation element 130 may substantially have a relatively long straight-line shape. Specifically, the second radiation element 130 has a first end 131 and a second end 132. The second end 132 of the second radiation element 130 is an open end. For example, the second end 132 of the second radiation element 130 and the second end 122 of the first radiation element 120 may substantially extend in the same direction. The second radiation element 130 is adjacent to the first radiation element 120. A coupling gap GC1 may be formed between the second radiation element 130 and the first radiation element 120. It should be noted that the term "adjacent" or "close" over the disclosure means that the distance (spacing) between two corresponding elements is smaller than a predetermined distance (e.g., 10 mm or shorter), but often does not mean that the two corresponding elements directly touch each other (i.e., the aforementioned distance/spacing therebetween is reduced to 0).

The third radiation element 140 may substantially have a relatively short straight-line shape (in comparison to the second radiation element 130). Specifically, the third radiation element 140 has a first end 141 and a second end 142. The first end 141 of the third radiation element 140 is coupled to the first end 131 of the second radiation element 130. The second end 142 of the third radiation element 140 is an open end. For example, the second end 142 of the third radiation element 140 and the second end 132 of the second radiation element 130 may substantially extend in opposite directions and away from each other.

The shorting radiation element 150 may substantially have an N-shape. Specifically, the shorting radiation element 150 has a first end 151 and a second end 152. The first end 151 of the shorting radiation element 150 is coupled to a ground voltage VSS. The second end 152 of the shorting radiation element 150 is coupled to the first end 131 of the second radiation element 130 and the first end 141 of the third radiation element 140. In other words, both the second radiation element 130 and the third radiation element 140 are coupled through the shorting radiation element 150 to a ground voltage VSS. For example, the ground voltage VSS may be provided by a ground copper foil. In some embodiments, the aforementioned ground copper foil is further coupled to a system ground plane (not shown) of the mobile device 100.

The fourth radiation element 160 may substantially have another L-shape. For example, the fourth radiation element 160 may be surrounded by the feeding radiation element 110, the first radiation element 120, the second radiation element 130, and the shorting radiation element 150. Specifically, the fourth radiation element 160 has a first end 161 and a second end 162. The first end 161 of the fourth radiation element 160 is coupled to the feeding point FP. The second end 162 of the fourth radiation element 160 is an open end, which extends toward the first radiation element 120. The fourth radiation element 160 is adjacent to the second radiation element 130. A second coupling gap GC2 may be formed between the fourth radiation element 160 and the second radiation element 130.

The fifth radiation element 170 may substantially have another straight-line shape. Specifically, the fifth radiation element 170 has a first end 171 and a second end 172. The first end 171 of the fifth radiation element 170 is coupled to the feeding point FP. The second end 172 of the fifth radiation element 170 is an open end, which extends toward the shorting radiation element 150. The fifth radiation element 170 is adjacent to the shorting radiation element 150. A third coupling gap GC3 may be formed between the fifth radiation element 170 and the shorting radiation element 150.

In a preferred embodiment, an antenna structure of the mobile device 100 is formed by the feeding radiation element 110, the first radiation element 120, the second radiation element 130, the third radiation element 140, the shorting radiation element 150, the fourth radiation element 160, and the fifth radiation element 170. For example, the aforementioned antenna structure may be a planar antenna structure. However, the invention is not limited thereto. In alternative embodiments, the aforementioned antenna structure is modified to a 3D (Three-Dimensional) antenna structure. According to practical measurements, the antenna structure of the mobile device 100 can cover the wideband operations of the next 5G (5th Generation Wireless System) communication.

The following embodiments will introduce different configurations and detailed structural features of the mobile device 100. It should be understood that these figures and descriptions are merely exemplary, rather than limitations of the invention.

Figure 2:
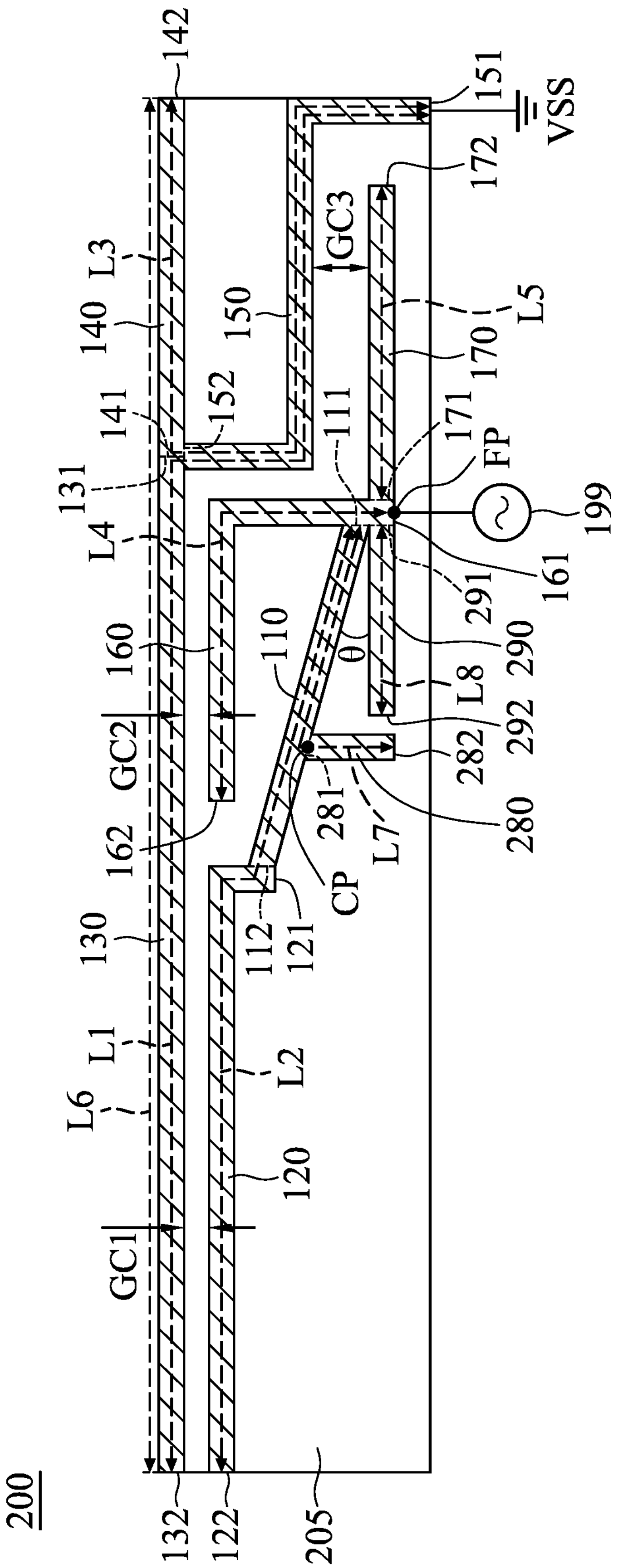
FIG. 2 is a top view of a mobile device according to an embodiment of the invention.

FIG. 2 is a top view of a mobile device 200 according to an embodiment of the invention. FIG. 2 is similar to FIG. 1. In the embodiment of FIG. 2, the mobile device 200 further includes a dielectric substrate 205, a sixth radiation element 280, and s seventh radiation element 290. The dielectric substrate 205 may be implemented with an FR4 (Flame Retardant 4) substrate, a PCB (Printed Circuit Board), or an FPC (Flexible Printed Circuit). The sixth radiation element 280 and the seventh radiation element 290 may be made of metal materials. The feeding radiation element 110, the first radiation element 120, the second radiation element 130, the third radiation element 140, the shorting radiation element 150, the fourth radiation element 160, the fifth radiation element 170, the sixth radiation element 280, and the seventh radiation element 290 are all disposed on the same surface of the dielectric substrate 205, so as to form a planar antenna structure of the mobile device 200.

The sixth radiation element 280 may substantially have a rectangular shape. Specifically, the sixth radiation element 280 has a first end 281 and a second end 282. The first end 281 of the sixth radiation element 280 is coupled to a connection point CP on the feeding radiation element 110. The second end 282 of the sixth radiation element 280 is an open end.

The seventh radiation element 290 may substantially have another straight-line shape. Specifically, the seventh radiation element 290 has a first end 291 and a second end 292. The first end 291 of the seventh radiation element 290 is coupled to the feeding point FP. The second end 292 of the seventh radiation element 290 is an open end, which extend toward the second end 282 of the sixth radiation element 280. In addition, the aforementioned tilt angle θ may be formed between the feeding radiation element 110 and the seventh radiation element 290. According to practical measurements, the sixth radiation element 280 and the seventh radiation element 290 can help to increase the operational bandwidth of the antenna structure of the mobile device 200. However, the sixth radiation element 280 and the seventh radiation element 290 are both optional elements, and they are omitted in other embodiments. Other features of the mobile device 200 of FIG. 2 are similar to those of the mobile device 100 of FIG. 1. Accordingly, the two embodiments can achieve similar levels of performances.

Figure 3:
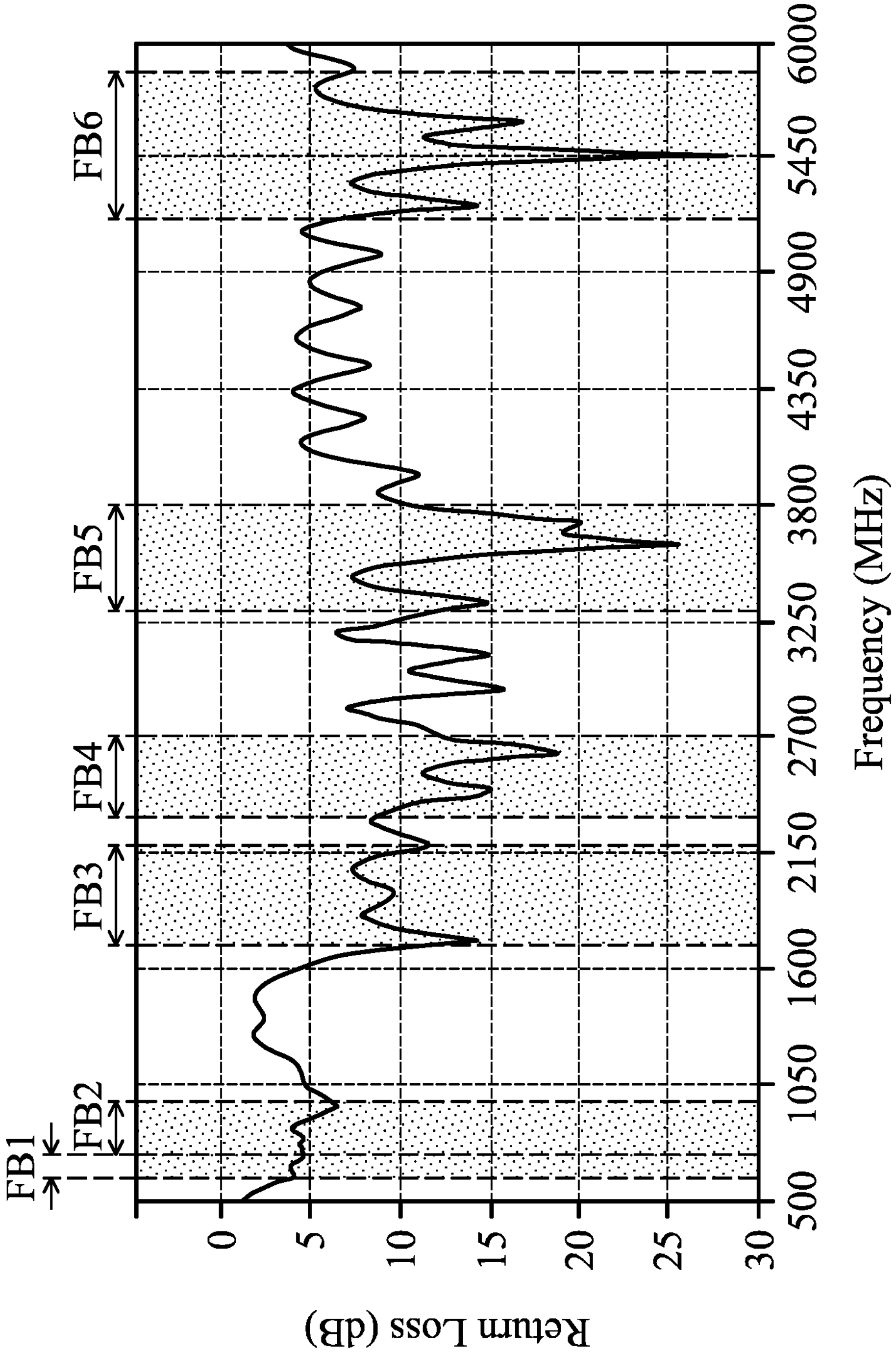
FIG. 3 is a diagram of return loss of an antenna structure of a mobile device according to an embodiment of the invention.

FIG. 3 is a diagram of return loss of the antenna structure of the mobile device 200 according to an embodiment of the invention. The horizontal axis represents the operational frequency (MHz), and the vertical axis represents the return loss (dB). According to the measurement of FIG. 3, the antenna structure of the mobile device 200 can cover a first frequency band FB1, a second frequency band FB2, a third frequency band FB3, a fourth frequency band FB4, a fifth frequency band FB5, and a sixth frequency band FB6. For example, the first frequency band FB1 may be from 600 MHz to 700 MHz, the second frequency band FB2 may be from 700 MHz to 960 MHz, the third frequency band FB3 may be from 1710 MHz to 2170 MHz, the fourth frequency band FB4 may be from 2300 MHz to 2700 MHz, the fifth frequency band FB5 may be from 3300 MHz to 3800 MHz, and the sixth frequency band FB6 may be from 5150 MHz to 5850 MHz. Therefore, the mobile device 200 can support at least the wideband operations of the next 5G communication.

In some embodiments, the operational principles of the antenna structure of the mobile device 200 will be described as follows. The second radiation element 130 and the shorting radiation element 150 are excited to generate the aforementioned first frequency band FB1. The feeding radiation element 110 and the first radiation element 120 are excited to generate the aforementioned second frequency band FB2. The third radiation element 140 and the shorting radiation element 150 are excited to generate the aforementioned third frequency band FB3. The fourth radiation element 160 and the fifth radiation element 170 are excited to generate the aforementioned fourth frequency band FB4. The second radiation element 130 and the third radiation element 140 are excited to generate the aforementioned fifth frequency band FB5. The feeding radiation element 110 and the sixth radiation element 280 are excited to generate the aforementioned sixth frequency band FB6. In addition, the seventh radiation element 290 is configured to fine-tune the impedance matching of the aforementioned sixth frequency band FB6.

Figure 4:
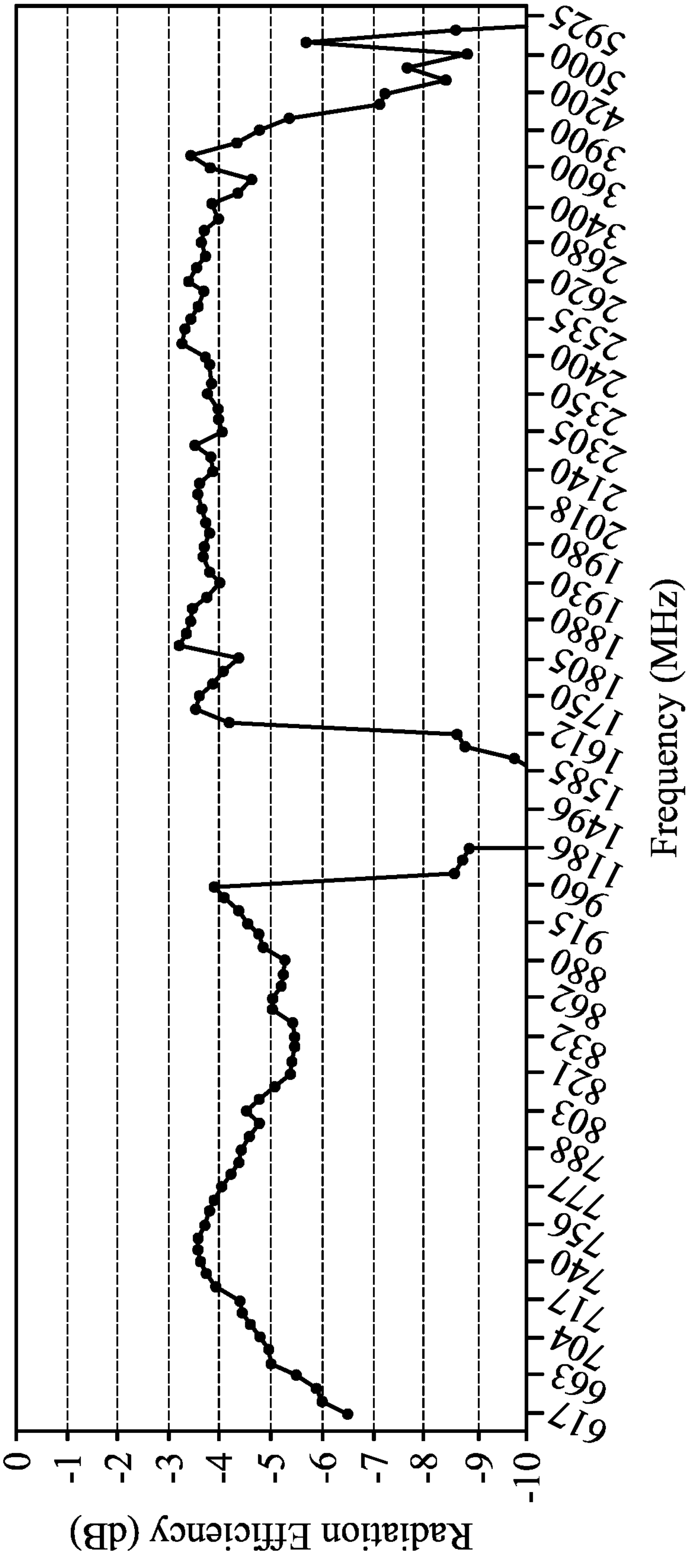
FIG. 4 is a diagram of the radiation efficiency of an antenna structure of a mobile device according to an embodiment of the invention.

FIG. 4 is a diagram of the radiation efficiency of the antenna structure of the mobile device 200 according to an embodiment of the invention. The horizontal axis represents the operational frequency (MHz), and the vertical axis represents the radiation efficiency (dB). According to the measurement of FIG. 4, the radiation efficiency of the antenna structure of the mobile device 200 can reach −6 dB or higher within the first frequency band FB1, the second frequency band FB2, the third frequency band FB3, the fourth frequency band FB4, the fifth frequency band FB5, and the sixth frequency band FB6 as mentioned above. It can meet the requirements of practical applications of general mobile communication devices.

In some embodiments, the element sizes of the mobile device 200 (or 100) will be described as follows. The total length L1 of the second radiation element 130 and the shorting radiation element 150 may be substantially equal to 0.25 wavelength (λ/4) of the first frequency band FB1 of the antenna structure of the mobile device 200. The total length L2 of the feeding radiation element 110 and the first radiation element 120 may be substantially equal to 0.25 wavelength (λ/4) of the second frequency band FB2 of the antenna structure of the mobile device 200. The total length L3 of the third radiation element 140 and the shorting radiation element 150 may be substantially equal to 0.25 wavelength (λ/4) of the third frequency band FB3 of the antenna structure of the mobile device 200. The length L4 of the fourth radiation element 160 may be substantially equal to 0.25 wavelength (λ/4) of the fourth frequency band FB4 of the antenna structure of the mobile device 200. The length L5 of the fifth radiation element 170 may be substantially equal to 0.25 wavelength (λ/4) of the fourth frequency band FB4 of the antenna structure of the mobile device 200. The total length L6 of the second radiation element 130 and the third radiation element 140 may be substantially equal to 1.5 wavelength (3V2) of the fifth frequency band FB5 of the antenna structure of the mobile device 200. A resonant path is formed from the feeding point FP through the connection point CP to the second end 282 of the sixth radiation element 280. The length L7 of the resonant path may be substantially equal to 0.25 wavelength (λ/4) of the sixth frequency band FB6 of the antenna structure of the mobile device 200. The length L8 of the seventh radiation element 290 may be shorter than or equal to 0.25 wavelength (λ/4) of the sixth frequency band FB6 of the antenna structure of the mobile device 200. The width of the first coupling gap GC1 may be from 0.5 mm to 1 mm. The width of the second coupling gap GC2 may be from 0.5 mm to 1 mm. The width of the third coupling gap GC3 may be from 0.5 mm to 1 mm. The above ranges of element sizes and parameters are calculated and obtained according to many experiment results, and they help to optimize the operational bandwidth and impedance matching of the antenna structure of the mobile device 200 (or 100).

Figure 5:
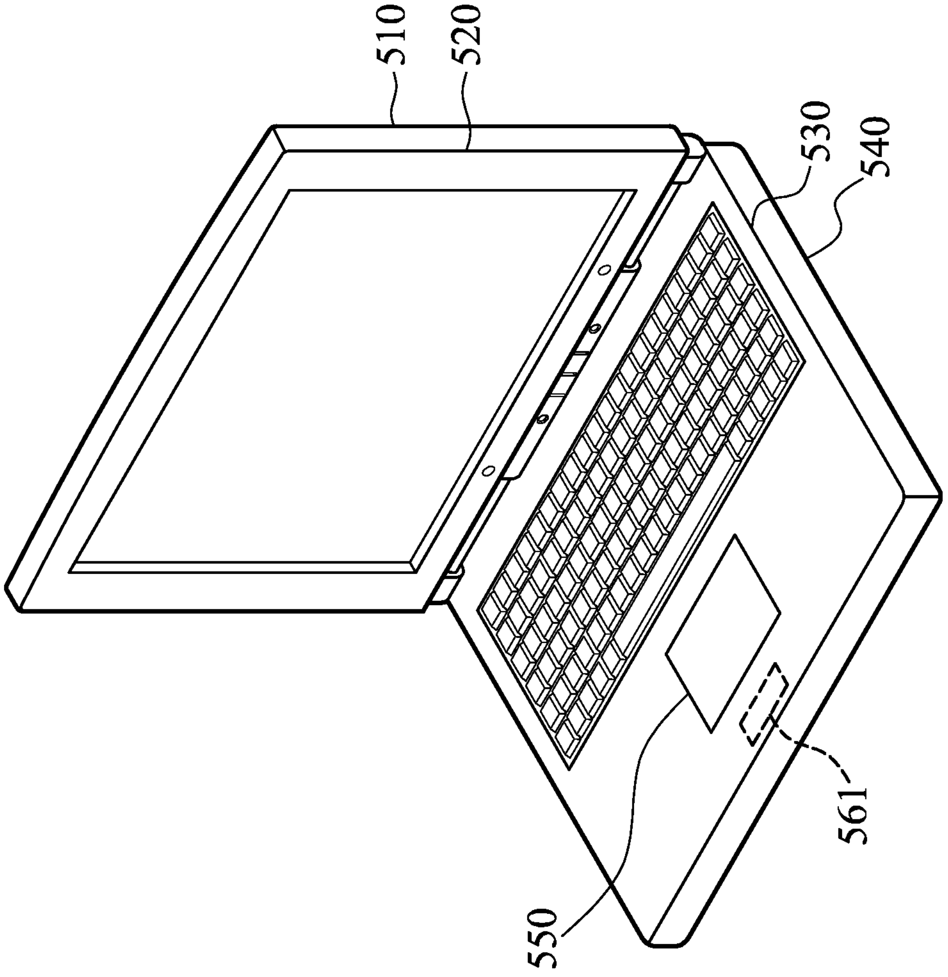
FIG. 5 is a perspective view of a notebook computer according to an embodiment of the invention.

FIG. 5 is a perspective view of a notebook computer 500 according to an embodiment of the invention. In the embodiment of FIG. 5, the aforementioned antenna structure is applied to the notebook computer 500. The notebook computer 500 includes an upper housing 510, a display frame 520, a keyboard frame 530, and a base housing 540. It should be understood that the upper housing 510, the display frame 520, the keyboard frame 530, and the base housing 540 are equivalent to the so-called "A-component", "B-component", "C-component", and "D-component" in the field of notebook computers, respectively. The aforementioned antenna structure may be disposed at a specific position 561 of the notebook computer 500, and it may be covered by the nonconductive keyboard frame 530. It is also noted that the specific position 561 is adjacent to a touch control pad 550 of the notebook computer 500. According to practical measurements, since the whole antenna size of the invention is very small, the proposed design can be applied to a variety of small-size mobile devices, and it can also ensure good communication quality and operational bandwidth.

The invention proposes a novel mobile device with a novel antenna structure. In comparison to the conventional design, the invention has at least the advantages of application in different environments, small size, wide bandwidth, high radiation efficiency, and low manufacturing cost. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-5. The invention may merely include any one or more features of any one or more embodiments of FIGS. 1-5. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a feeding radiation element, having a feeding point;

a first radiation element, coupled to the feeding radiation element;

a second radiation element, disposed adjacent to the first radiation element;

a third radiation element, coupled to the second radiation element, wherein the third radiation element and the second radiation element substantially extend in opposite directions;

a shorting radiation element, wherein the second radiation element and the third radiation element are coupled through the shorting radiation element to a ground voltage;

a fourth radiation element, coupled to the feeding point, wherein the fourth radiation element is adjacent to the second radiation element; and a fifth radiation element, coupled to the feeding point, wherein the fifth radiation element is adjacent to the shorting radiation element;

wherein an antenna structure is formed by the feeding radiation element, the first radiation element, the second radiation element, the third radiation element, the shorting radiation element, the fourth radiation element, and the fifth radiation element.

2. The mobile device as claimed in claim 1, wherein the feeding radiation element has a tilt angle from 30 to 60 degrees.

3. The mobile device as claimed in claim 1, further comprising:

a sixth radiation element, coupled to the feeding radiation element, wherein the sixth radiation element substantially has a rectangular shape.

4. The mobile device as claimed in claim 3, further comprising:

a seventh radiation element, coupled to the feeding point, wherein the seventh radiation element extends toward the sixth radiation element.

5. The mobile device as claimed in claim 4, further comprising:

a dielectric substrate, wherein the feeding radiation element, the first radiation element, the second radiation element, the third radiation element, the shorting radiation element, the fourth radiation element, the fifth radiation element, the sixth radiation element, and the seventh radiation element are disposed on the dielectric substrate.

6. The mobile device as claimed in claim 1, wherein a first coupling gap is formed between the second radiation element and the first radiation element, wherein a second coupling gap is formed between the fourth radiation element and the second radiation element, and wherein a third coupling gap is formed between the fifth radiation element and the shorting radiation element.

7. The mobile device as claimed in claim 6, wherein a width of each of the first coupling gap, the second coupling gap, and the third coupling gap is from 0.5 mm to 1 mm.

8. The mobile device as claimed in claim 4, wherein the antenna structure covers a first frequency band, a second frequency band, a third frequency band, a fourth frequency band, a fifth frequency band, and a sixth frequency band.

9. The mobile device as claimed in claim 8, wherein the first frequency band is from 600 MHz to 700 MHz, the second frequency band is from 700 MHz to 960 MHz, the third frequency band is from 1710 MHz to 2170 MHz, the fourth frequency band is from 2300 MHz to 2700 MHz, the fifth frequency band is from 3300 MHz to 3800 MHz, and the sixth frequency band is from 5150 MHz to 5850 MHz.

10. The mobile device as claimed in claim 8, wherein a total length of the second radiation element and the shorting radiation element is substantially equal to 0.25 wavelength of the first frequency band.

11. The mobile device as claimed in claim 8, wherein a total length of the feeding radiation element and the first radiation element is substantially equal to 0.25 wavelength of the second frequency band.

12. The mobile device as claimed in claim 8, wherein a total length of the third radiation element and the shorting radiation element is substantially equal to 0.25 wavelength of the third frequency band.

13. The mobile device as claimed in claim 8, wherein a length of each of the fourth radiation element and the fifth radiation element is substantially equal to 0.25 wavelength of the fourth frequency band.

14. The mobile device as claimed in claim 8, wherein a total length of the second radiation element and the third radiation element is substantially equal to 1.5 wavelength of the fifth frequency band.

15. The mobile device as claimed in claim 8, wherein a length of the seventh radiation element is shorter than or equal to 0.25 wavelength of the sixth frequency band.

* * * * *